No. 862,556. PATENTED AUG. 6, 1907.
R. G. HANDY.
EQUALIZING SUSPENSION DEVICE FOR VEHICLES.
APPLICATION FILED OCT. 25, 1906.
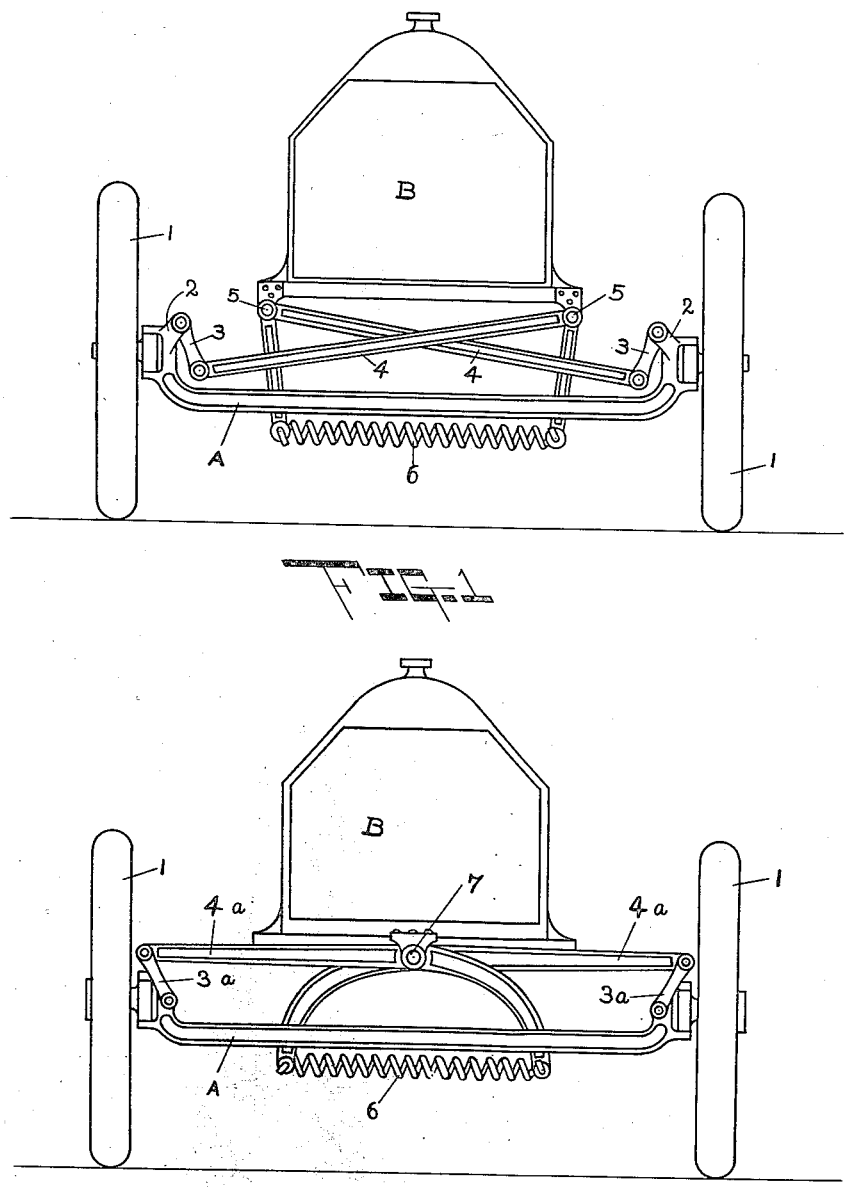
WITNESSES:
J Ray Abbey
Ralph S. Warfield
INVENTOR
Robert G. Handy
BY
Geo. B. Willcox
ATTORNEY

UNITED STATES PATENT OFFICE.

ROBERT G. HANDY, OF BAY CITY, MICHIGAN.

EQUALIZING SUSPENSION DEVICE FOR VEHICLES.

No. 862,556.     Specification of Letters Patent.     Patented Aug. 6, 1907.

Application filed October 25, 1906. Serial No. 340,531.

*To all whom it may concern:*

Be it known that I, ROBERT G. HANDY, a citizen of the United States, residing at Bay City, in the county of Bay and State of Michigan, have invented certain new and useful Improvements in Equalizing Suspension for Vehicles;.and I do hereby declare the following to be a full, clear, and exact description of the invention, such as will enable others skilled in the art to which it appertains to make and use the same.

My invention relates to means for supporting vehicles, and while I have shown it as applied to a motor vehicle, its use is not restricted to this art.

It is well known that the weight of any four wheeled vehicle is distributed upon the four points of support, the wheels. When one of the wheels is raised or lowered above or beneath the level of the remaining wheels, as in passing over an obstruction or in entering a depression, such wheel assumes a larger share of the load than it normally sustains, when all four wheels are level.

Another consequence is that in the common method of mounting the vehicle body on the axles, the body and axles tip together, thereby throwing the body out of its normal plane. Thus one wheel on being raised by passing over a stone, for instance, occasions greater upward pressure on the frame at that point than at the other points of support, tending to raise the frame at the point of upward pressure. If one wheel is lowered, as by entering a rut, the pressure is less at that point and the body tends to twist or tilt downward on one side to equalize the suspension.

The objects of my invention are to obviate these disadvantages and also to greatly reduce or avoid the transmission to the body of the shock caused by the impact of the wheels with an obstacle or upon entering a depression. The method of suspension herein shown obviates these twisting strains by interconnecting the suspension of each side of the frame, so that pressure on one side of the frame can not be greater than on the other side because of such interconnection.

Another object is to reduce the twisting strains of the frame or body, so that raising one wheel, as in passing over a stone or obstruction will not increase the load on such wheel. In the ordinary suspension where the frame is attached to the axles close to the wheels, the load on the wheel increases rapidly as the wheel is raised above and decreases when such wheel is lowered below the level of the remaining wheels.

To these and other ends, therefore, my invention consists in certain novel features and combinations, together with their equivalents such as will be more fully described hereinafter and particularly pointed out in the claims.

In the accompanying drawings, Figure 1 is a front view of a motor vehicle equipped with my invention. Fig. 2 is a similar view showing a slight modification thereof, which, however, is capable of being used in combination with the structure shown in Fig. 1.

The drawings illustrate two forms embodying my invention, but there are other constructions to which the invention may be applied.

In the drawings, (A) indicates the front axle of a vehicle, to the ends of which axle are secured the wheels (1) (1) and (B) indicates the frame or body of the vehicle, all of which features being old in the art need no further description, it being obvious that the invention is as applicable to the rear axle as to the front axle.

Referring now more particularly to Fig. 1, (2) (2) indicate brackets located near the opposite ends of the axle and to which the links (3) (3) are pivotally secured at one end. These links are shown as depending from their respective supports, but this is not necessary, as a glance at Fig. 2 will show.

A pair of L-levers (4) (4) are pivotally secured at their angles to the opposite sides or corners of the frame (B), as shown at (5), the longer arm of each lever extending transversely beneath the frame and being pivotally connected to the free ends of the respective links (3) (3). It will be seen that the levers cross each other at a point approximately in line with the longitudinal center of the frame. It will also be observed that the body or frame is supported at two opposite points, the weight being the same on each point of suspension, this latter feature constituting the point of difference between the structures shown in Figs. (1) and (2).

The shorter arms of the L-levers are shown as depending from the pivotal points (5) (5), the free ends of the short arms being connected by means of a spring (6), so that the amount one wheel tends to raise one side of the frame is so transmitted through the suspension as to tend to lower the other side, but the weight on each side is the same due to the spring connection.

From the foregoing, it is obvious that if the wheel, on the right side say, passes over a stone or other obstruction it will not be subjected to any weight more than it normally supports when on a level with the other wheels and furthermore, the body or frame does not tilt with the axle, but remains level at all times, the spring and levers causing it to adjust itself to any ordinary inclination. Also the shocks caused by the engagement of the wheel with and upon leaving an obstruction, will be cushioned by the spring suspension and the L-shaped rods or levers.

Fig. 2 discloses a similar structure comprising links (3ª) (3ª) pivotally secured to the axle just inside the wheels, the outer ends of the links being pivotally connected to the respective ends of the oppositely extending long arms of L-shaped levers (4ª) (4ª), the shorter arms of which are connected by the spring (6ª), but in this instance the levers are pivotally connected together and to the approximate center of the body, as at (7), the action being just the same as in the structure shown in Fig. 1, except that there is only a single point of suspension.

It is plain that the form shown in Fig. 1 could be used on both front and rear axles affording a four point suspension, but the form shown in Fig. 2 could not be used alone, since the body would only have a two point suspension and hence be free to swing laterally in either direction, wherefore I consider it preferable to equip one axle with the form shown in Fig. 1 and the other axle with the form shown in Fig. 2 affording a three point suspension, or I may prefer to equip both ends of the body with a two-point suspension.

The construction shown in Fig. 2 allows or is a shortening of the levers from the axle end to the pivot, thus admitting of the same equalizing movement and a spring of lighter weight, owing to longer leverage.

The shorter arms of the levers, (that is from their pivotal points to the free ends connected by the springs) are so formed as to have a relative movement corresponding to the remaining longer arms of the levers and coöperate therewith.

It is evident that many changes might be made in the form and arrangements of the several parts described other than those set forth, without departing from the spirit and scope of my invention, hence I do not wish to limit myself to the exact construction herein set forth.

Having thus fully disclosed my invention, what I claim as new is—

1. The combination with a frame, axles and wheels, of an equalizing suspension device comprising a pair of L-levers pivotally secured intermediate their ends to two opposite sides of the frame, the long arms of the levers crossing each other, links pivotally secured to the opposite ends of the axle, the free end of each long arm being pivotally connected to the free end of that link farthest from the point of connection of the lever and frame, and a spring connecting the free ends of the remaining arms of the levers.

2. An equalizing suspension for vehicles comprising a pair of crossed angle levers pivotally secured at their angles to the frame, one end of each lever being loosely secured to the axle structure and a yielding mechanism connecting the opposite free ends of the respective levers.

3. The combination with axles, wheels, and a frame, of a pair of crossed angle levers pivotally secured at their angles to the frame, means for pivotally connecting the outer ends of the oppositely extending arms of the levers to an axle near its outer ends, the inner arms of the levers lying approximately parallel to each other, and a spring for connecting the free ends of the approximately parallel arms.

4. An equalizing suspension device for vehicles comprising a pair of L-levers, each of which is pivoted at its angle to the body, the outer arms of the levers extending in opposite directions, the free ends of the oppositely extending arms being loosely connected with an axle and a spring connecting the inner ends of the arms.

5. The combination with a body, axles and wheels, of an equalizing suspension comprising two pairs of crossed angle levers, the outer ends of each pair of levers being pivotally connected to the respective axles, one pair of levers being separately pivoted at their angles to opposite sides of the body, the remaining pair of levers being pivotally secured at their angles to each other and to the body, and springs connecting the inner arms of each pair of levers.

6. An equalizing suspension device for vehicles comprising a pair of crossed angle levers pivoted at their angles to the vehicle, links connecting the outer ends of the levers, and a spring directly connecting the inner ends of the levers.

In testimony whereof, I affix my signature in presence of two witnesses.

ROBERT G. HANDY.

Witnesses:
CLARENCE D. TARBELL,
EVELYN K. FIELD.